United States Patent
Barrett et al.

(10) Patent No.: US 10,651,445 B2
(45) Date of Patent: May 12, 2020

(54) ELECTRODE WITH CELLULOSE ACETATE SEPARATOR SYSTEM

(71) Applicant: ZAF Energy Systems, Incorporated, Columbia Falls, MT (US)

(72) Inventors: Sean Barrett, Bigfork, MT (US); Adam Weisenstein, Kalispell, MT (US); Cody R. Carter, Kalispell, MT (US); William A. Garcia, Columbia Falls, MT (US)

(73) Assignee: ZAF Energy Systems, Incorporated, Bozeman, MT (US)

( * ) Notice: Subject to any disclaimer, the term of this patent is extended or adjusted under 35 U.S.C. 154(b) by 128 days.

(21) Appl. No.: 15/877,983

(22) Filed: Jan. 23, 2018

(65) Prior Publication Data

US 2018/0212221 A1    Jul. 26, 2018

Related U.S. Application Data

(60) Provisional application No. 62/449,281, filed on Jan. 23, 2017.

(51) Int. Cl.
*H01M 2/16* (2006.01)
*H01M 10/30* (2006.01)
*H01M 4/24* (2006.01)
*H01M 4/42* (2006.01)
*H01M 4/26* (2006.01)

(52) U.S. Cl.
CPC ....... *H01M 2/1673* (2013.01); *H01M 2/1606* (2013.01); *H01M 2/1653* (2013.01); *H01M 2/1686* (2013.01); *H01M 10/30* (2013.01); *H01M 4/244* (2013.01); *H01M 4/26* (2013.01); *H01M 4/42* (2013.01)

(58) Field of Classification Search
CPC ............ H01M 2/1673; H01M 2/1606; H01M 2/1653; H01M 2/1686; H01M 10/30; H01M 4/244; H01M 4/26; H01M 4/42
See application file for complete search history.

(56) References Cited

U.S. PATENT DOCUMENTS 3,023,261 A * 2/1962 Louis ............... H01M 2/14 429/137
3,097,975 A * 7/1963 Horn ............... H01M 2/1666 429/141

(Continued)

FOREIGN PATENT DOCUMENTS

| CN | 101771175 A | 7/2010 |
| EP | 2581975 A1 | 4/2013 |
| KR | 20120023491 A | 3/2012 |

OTHER PUBLICATIONS

International Search Report and Written Opinion of the International Searching Authority for International Application No. PCT/US2018/014857, dated May 4, 2018, 6 pgs.

(Continued)

*Primary Examiner* — Ula C Ruddock
*Assistant Examiner* — Matthew W Van Oudenaren
(74) *Attorney, Agent, or Firm* — Brooks Kushman P.C.

(57) ABSTRACT

An electrode assembly includes an electrode saturated with electrolyte, and one or more ionically conductive and electronically insulating cellulose acetate coatings forming a continuous and conformal film adhered to and encapsulating the electrode.

10 Claims, 7 Drawing Sheets

(56) References Cited

U.S. PATENT DOCUMENTS

| | | | |
|---|---|---|---|
| 3,573,106 | A | 3/1971 | Johnson et al. |
| 3,894,889 | A | 7/1975 | Gillman et al. |
| 4,125,685 | A | 11/1978 | Bloom et al. |
| 5,798,180 | A | 8/1998 | Chowdhury et al. |
| 6,479,190 | B1 * | 11/2002 | Wensley ............... H01M 2/14 |
| | | | 429/144 |
| 2005/0208372 | A1 | 9/2005 | Watson et al. |
| 2010/0279167 | A1 | 11/2010 | Watson et al. |
| 2016/0226048 | A1 | 8/2016 | Mario et al. |

OTHER PUBLICATIONS

Peter Kritzer et al., "Nonwovens as Separators for Alkaline Batteries", Journals of the Electrochemical Society, 154 (5), 2007, pp, A481-A494.

* cited by examiner

ELECTRODE WITH CELLULOSE ACETATE SEPARATOR SYSTEM

CROSS-REFERENCE TO RELATED APPLICATIONS

This application claims the benefit of U.S. Provisional Application No. 62/449,281, filed Jan. 23, 2017, the disclosure of which is hereby incorporated in its entirety by reference herein.

TECHNICAL FIELD

This disclosure relates to batteries and electrodes therefor.

BACKGROUND

Primary cells are designed to be used once and discarded. Generally speaking, the electrochemical reactions occurring in the cells are not reversible: As a primary cell is used, the reactions therein use up the chemicals that generate power and irreversible reaction products.

Secondary cells facilitate reversible cell reactions that allow them to recharge, or regain their cell potential, through the work done by passing currents and converting the products back to reactant status. As opposed to primary cells that experience irreversible electrochemical reactions such as gassing, secondary cell reactions can be reversed allowing for numerous charges and discharges.

SUMMARY

An electrode assembly includes an electrode saturated with electrolyte, and one or more ionically conductive and electronically insulating cellulose acetate coatings forming a continuous and conformal film adhered to and encapsulating the electrode. At least some of the coatings may be cellulose diacetate coatings or cellulose triacetate coatings. The electrode may be a positive electrode or a negative electrode. The coatings may be applied via dip coating, screen printing, slurry casting, spin coating, or spraying.

An electrode assembly includes an electrode saturated with electrolyte, and one or more fibrous layers impregnated with cellulose acetate and encompassing the electrode. The fibrous layers may form a continuous and conformal layer on the electrode. The cellulose acetate may be cellulose diacetate or cellulose triacetate. The electrode may be a positive electrode or a negative electrode. The fibrous layers may be impregnated by dip coating, screen printing, slurry casting, spin coating, or spraying. The fibrous layers may be saturated with the electrolyte. The fibrous layers may be wrapped around the electrode. The fibrous layers may be heat sealed to each other. The fibrous layers may be sealed to each other via an adhesive.

An electrode assembly includes an electrode saturated with electrolyte, and one or more ionically conductive and electronically insulating cellulose acetate sheets encompassing the electrode. The cellulose acetate sheets may form a pouch. At least some of the cellulose acetate sheets may be cellulose diacetate sheets or cellulose triacetate sheets. The electrode may be a positive electrode or a negative electrode. The cellulose acetate sheets may be in contact with the electrode. The sheets may be wrapped around the electrode. The sheets may be heat sealed to each other. The sheets may be sealed to each other via an adhesive.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Figure 1:
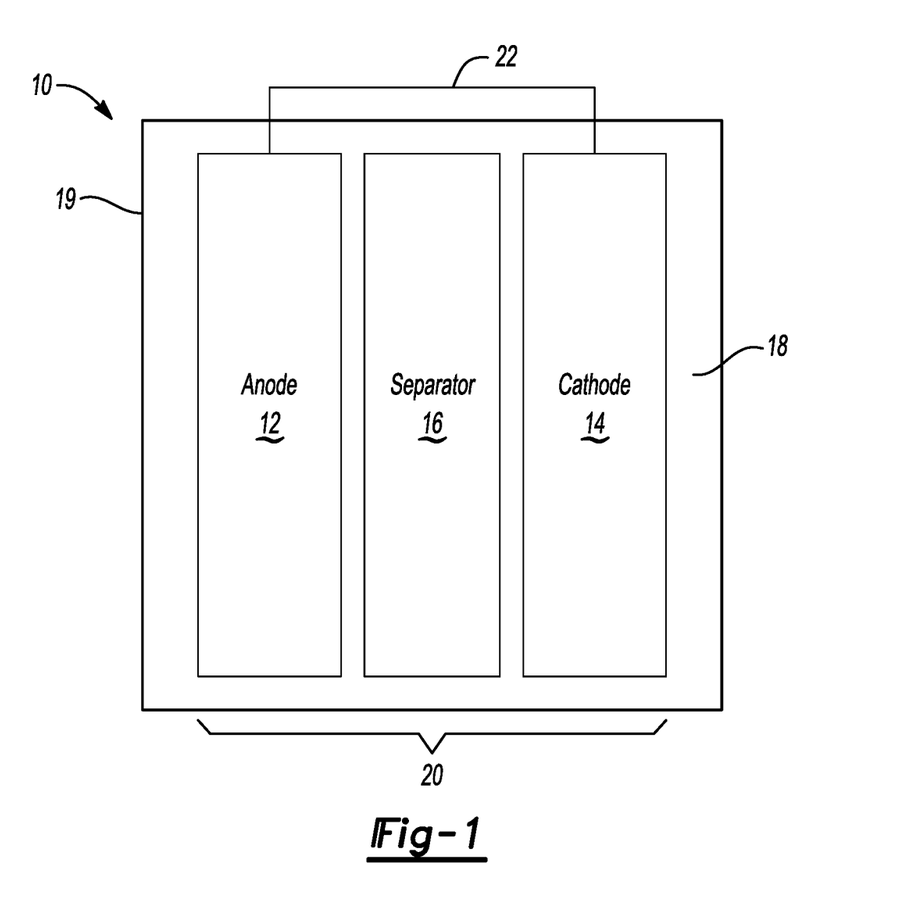
FIG. 1 is a schematic diagram of a battery.

Referring to FIG. 1, a battery 10 in concept includes an anode 12, cathode 14, and separator 16 disposed therebetween. These components may be separately or collectively bathed in electrolyte 18, and contained by housing 19. The anode 12, cathode 14, and separator 16 may be referred to as an electrode assembly 20, and be electrically connected via circuitry 22. The separator 16 physically separates the anode 12 and cathode 14. Ions, however, travel thereacross. During discharge, ions may travel from the cathode 14, through the separator 16, and to the anode 12. During charge, the ions may travel from the anode 12, through the separator 16, and to the cathode 14. The flow of current through the circuitry 22 accompanies this process.

Typical separators for zinc chemistry batteries include combinations of microporous polymer layers, which help to stop zinc dendrites from reaching the positive electrode and thus shorting the battery. These layers are robust and create long tortuous paths for zinc dendrites to have to penetrate though. Here, however, cellulose acetate as a stand-alone separator has been found to yield superior results in preventing shorting as compared to typical microporous separators, and to contribute to substantial increases in capacity retention during cycling. This was previously not thought possible due to the low strength nature and low porosity of cellulose acetate. In spite of sub-prime mechanical properties, this material is unexpectedly able to discourage dendritic shorting. Cellulose acetate has small pores, which are smaller than typical separators (e.g., 50 nm or smaller pores.) These pores are even smaller than the soluble zincate ions formed during both charge and discharge of the zinc electrode. Hence it can block the zincate ions from moving from the negative to the positive electrode. Additionally, cellulose acetate is ionically conductive, electronically insulating, and stable in an alkaline environment. Moreover, cellulose acetate has been found to be heat sealable and amenable to creating, for example, a sealed separator envelope around negative electrodes.

In certain embodiments, a cellulose triacetate layer (or layers) may be used as a separator (e.g., a coating or layer separating the anode and cathode, a sealed (adhesive or heat) pouch to contain the anode, a wrapping around the anode, etc.). In other embodiments, a cellulose acetate or cellulose diacetate layer (or layers), or combinations of cellulose acetate, cellulose diacetate, and cellulose triacetate layers may be similarly used. Cellulose triacetate, in certain environments, may be preferred to cellulose diacetate as it is mechanically stronger and more stable at elevated temperatures. Such separators may, of course, be synthesized with a chemically compatible binder/plasticizer, such as carboxymethyl cellulose, polyethylene glycol, polytetrafluoroethylene, polyvinyl alcohol, etc.

Figure 2:
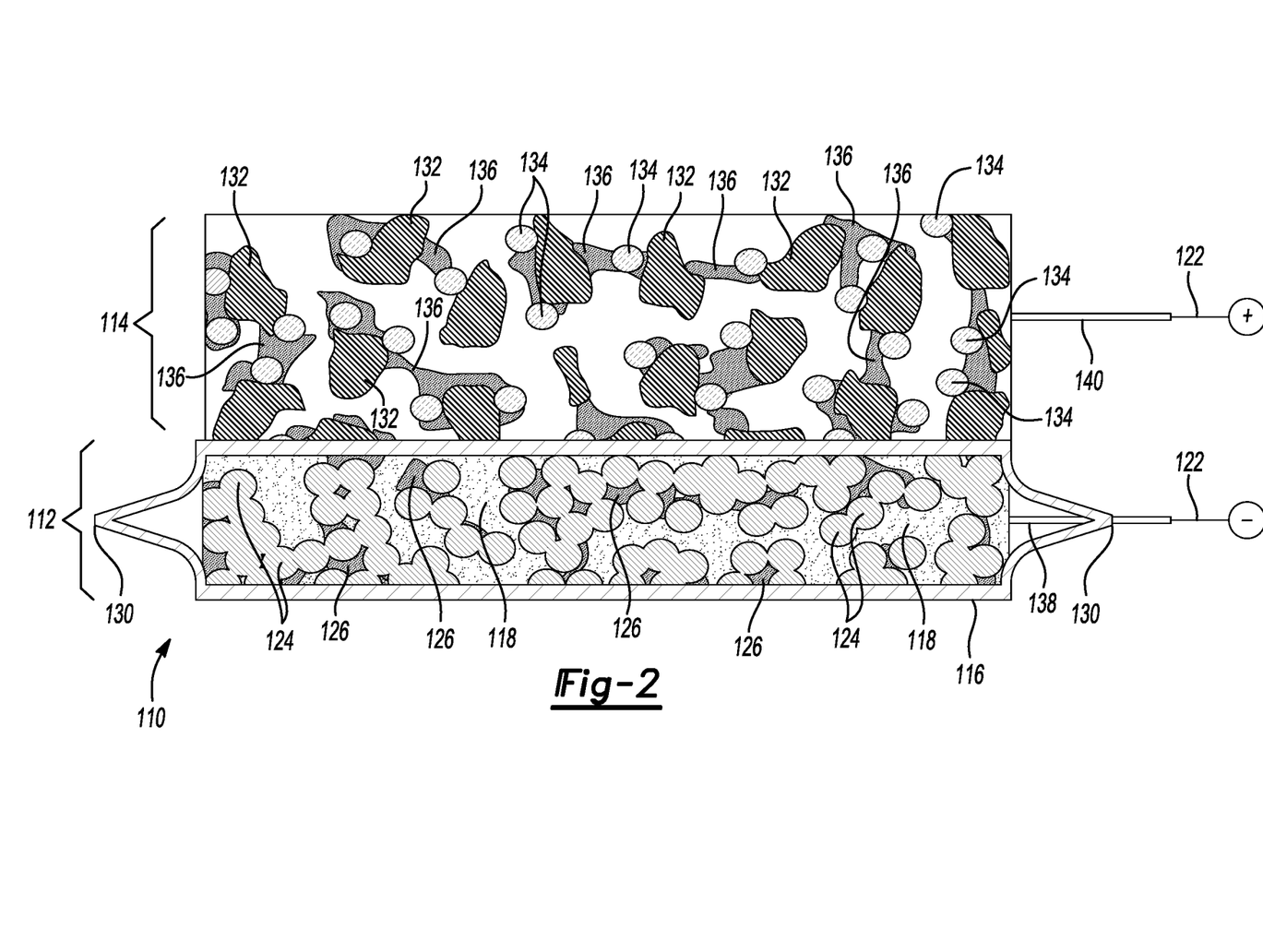
FIGS. 2, 3, 5, and 6 are side views, in cross-section, of portions of other batteries.

Referring to FIG. 2, a battery 110 includes an anode (negative electrode) structure 112 and a cathode (positive electrode) structure 114. In this example, the anode structure 112 includes active material particles 124 (e.g., aluminum, iron, zinc, etc.) held together via a binder or plasticizer 126 (e.g., acrylic binders, aromatic binders, carboxymethyl cellulose, perfluoropolyether, polyethylene glycol, polytetrafluoroethylene, polyvinyl alcohol, polyvinyl chloride, polyvinylidene fluoride, urethanes, various ionomers, etc.) to form a porous structure defining void spaces occupied by electrolyte 118 (e.g., alkaline). This structure and the electrolyte 118 are contained by a cellulose acetate pouch 116, which acts as a separator from the cathode structure 114. The pouch 116, in this example, comprises two sheets of a single monolayer of cellulose triacetate encapsulating the porous structure and electrolyte 118, and sealed (e.g., heat sealed) around a perimeter 130 thereof. In other examples, a single sheet (having a single layer or multiple layers) may be wrapped or adhesively sealed around the porous structure and electrolyte 118. In other examples, the pouch 116 may be comprised of cellulose acetate sheet(s) containing a fibrous substrate which can add structural integrity and/or improve wicking of the electrolyte 118. Other arrangements are also possible.

The cathode structure 114 includes a scaffold 132 (e.g., carbon fiber, carbon foam, conductive ceramics, conductive plastics, copper or nickel fiber, copper or nickel foam, copper or nickel mesh, copper or nickel punched metal, expanded metal, gold plated structures, platinum plated steel (or other metal), sintered nickel powder, titanium fibers, etc.), catalyst particles 134 (e.g., activated carbons, carbon blacks, graphites, hard carbons, hydroxides, metal oxides, perovskites, spinels, etc.) in contact with the scaffold 132, and a binder or plasticizer 136 (e.g., acrylic binders, aromatic binders, carboxymethyl cellulose, perfluoropolyether, polyethylene glycol, polytetrafluoroethylene, polyvinyl alcohol, polyvinyl chloride, polyvinylidene fluoride, urethanes, various ionomers, etc.) connecting the particles 134 to the scaffold 132. (Other cathode structures are of course contemplated.) A porosity of the scaffold 132 is such that void spaces (fluid passageways) facilitate flow therethrough.

The battery 110 further includes anode and cathode current collector tabs 138, 140 extending respectively away from the anode and cathode structures 112, 114, and circuitry 122 to facilitate the flow of current during operation. The pouch 116 is sealed to itself and around the anode current collector tab 138.

Figure 3:
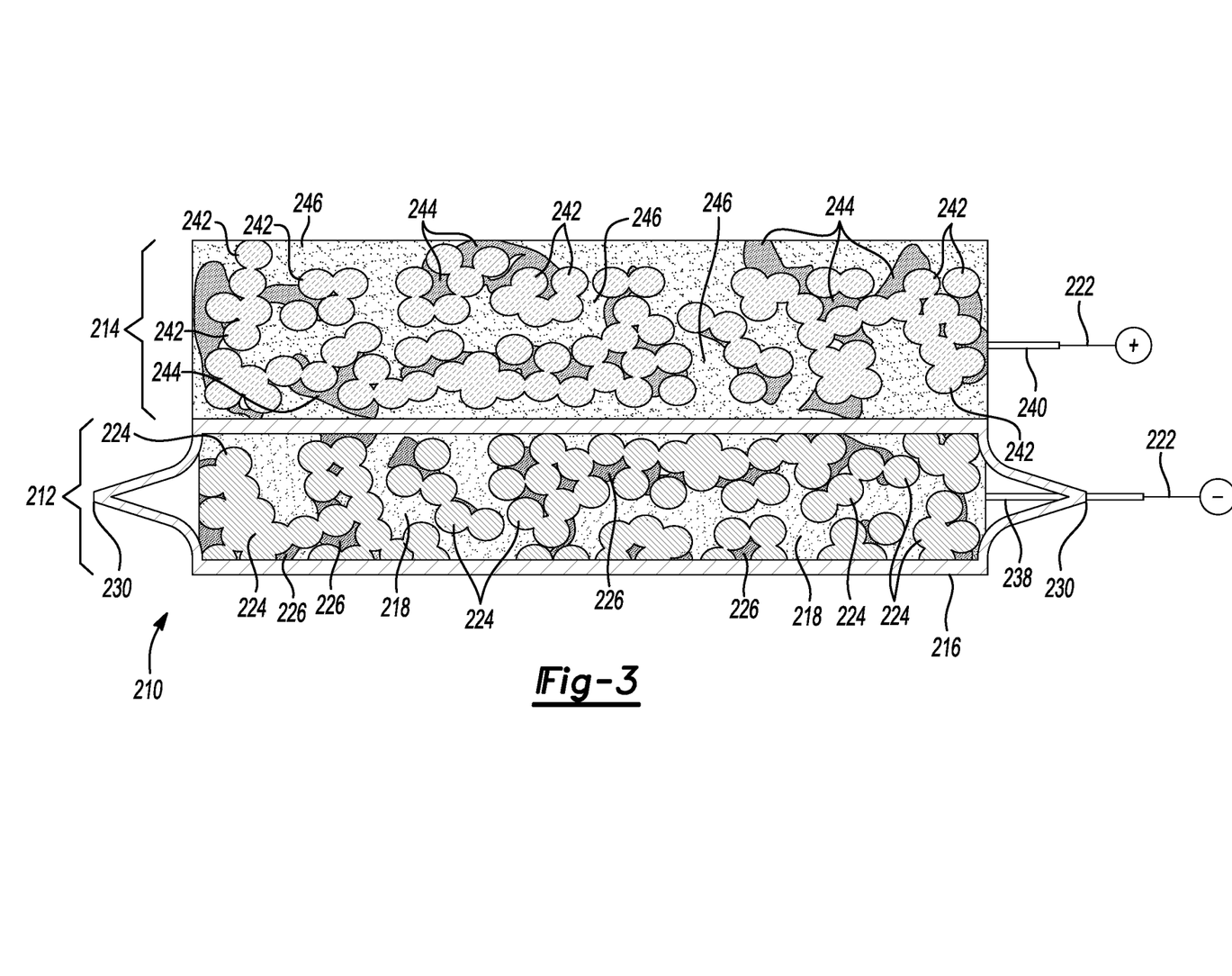

Referring to FIG. 3, a battery 210 includes an anode structure 212 and a cathode structure 214. In this example, the anode structure 212 includes active material particles 224 (e.g., aluminum, iron, zinc, etc.) held together via a binder or plasticizer 226 (e.g. acrylic binders, aromatic binders, carboxymethyl cellulose, perfluoropolyether, polyethylene glycol, polytetrafluoroethylene, polyvinyl alcohol, polyvinyl chloride, polyvinylidene fluoride, various ionomers, urethanes, etc.) to form a porous structure defining void spaces occupied by electrolyte 218 (e.g., alkaline). This structure and the electrolyte 218 are contained by a cellulose acetate pouch 216, which acts as a separator from the cathode structure 214. The pouch 216, in this example, comprises two sheets of a single monolayer of cellulose triacetate sandwiching the porous structure and electrolyte 218, and sealed (e.g., heat sealed) around a perimeter 230 thereof. In other examples, a single sheet (having a single layer or multiple layers) may be wrapped or adhesively sealed around the porous structure and electrolyte 218. In some examples, the pouch 216 may be comprised of cellulose acetate sheet(s) containing a fibrous substrate which can add structural integrity and/or improve wicking of the electrolyte 218. The cathode structure 214 includes active material particles 242 (e.g., hydroxides (e.g., $M(OH)_2$, where M=Al, Co, Fe, Mn, Ni, etc.)) held together via a binder or plasticizer 244 (e.g., acrylic binders, aromatic binders, carboxymethyl cellulose, perfluoropolyether, polyethylene glycol, polytetrafluoroethylene, polyvinyl alcohol, polyvinyl chloride, polyvinylidene fluoride, urethanes, various ionomers, etc.) to form a porous structure defining void spaces occupied by electrolyte 246 (e.g. alkaline).

The battery 210 further includes anode and cathode current collector tabs 238, 240 extending respectively away from the anode and cathode structures 212, 214, and circuitry 222 to facilitate the flow of current during operation. The pouch 216 is sealed to itself and around the anode current collector tab 238.

Figure 4:
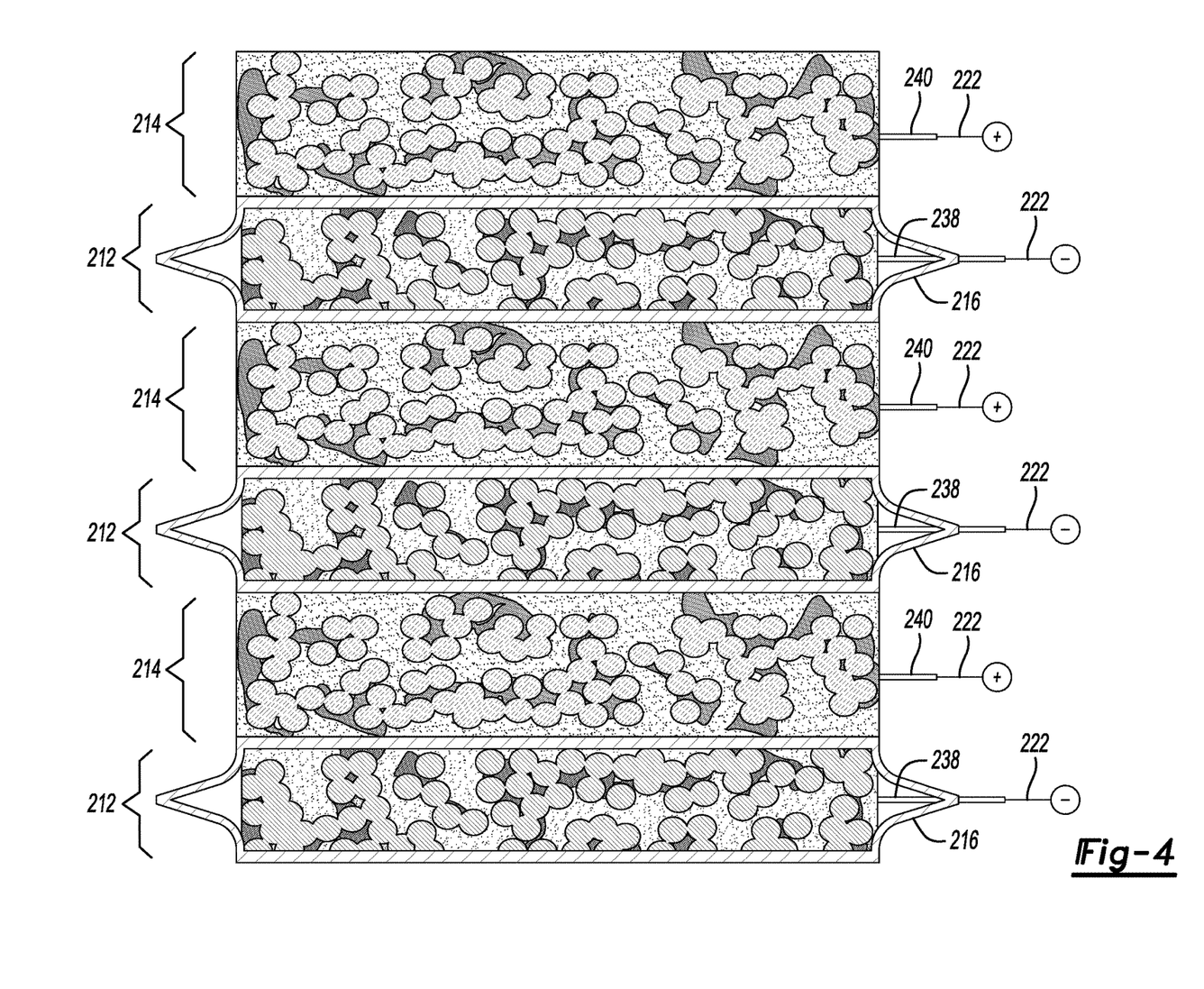
FIG. 4 is a side view, in cross-section, of the portion of the battery of FIG. 3 in stacked configuration.

Referring to FIG. 4, the anode and cathode structures 212, 214 may be stacked in an alternating fashion to increase battery capacity. Here again, the pouches 216 act as a separator between the anode and cathode structures 212, 214.

Figure 5:
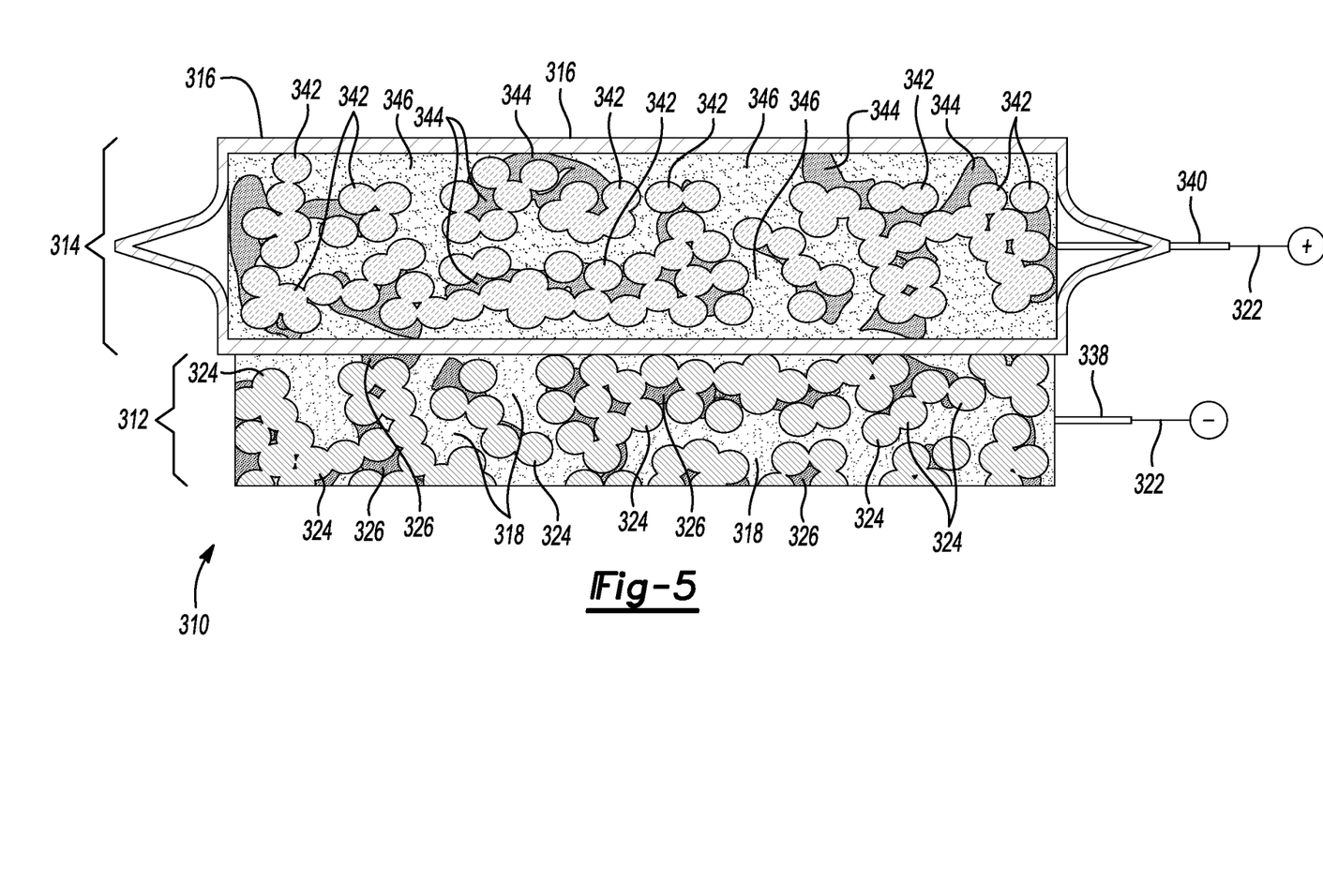

Referring to FIG. 5, a battery 310 includes an anode structure 312 and a cathode structure 314. In this example, the anode structure 312 includes active material particles 324 (e.g., aluminum, iron, zinc, etc.) held together via a binder or plasticizer 326 (e.g., acrylic binders, aromatic binders, carboxymethyl cellulose, perfluoropolyether, polyethylene glycol, polytetrafluoroethylene, polyvinyl alcohol, polyvinyl chloride, polyvinylidene fluoride, urethanes, various ionomers, etc.) to form a porous structure defining void spaces occupied by electrolyte 318 (e.g., alkaline). The cathode structure 314 includes active material particles 342 (e.g., hydroxides (e.g., $M(OH)_2$, where M=Al, Co, Fe, Mn, Ni, etc.)) held together via a binder or plasticizer 344 (e.g., acrylic binders, aromatic binders, carboxymethyl cellulose, perfluoropolyether, polyethylene glycol, polytetrafluoroethylene, polyvinyl alcohol, polyvinyl chloride, polyvinylidene fluoride, urethanes, various ionomers, etc.) to form a porous structure defining void spaces occupied by electrolyte 346 (e.g., alkaline). This structure and the electrolyte 346 are contained by a cellulose acetate wrapping 316, which acts as a separator from the anode structure 312. In some examples, the wrapping 316 includes one or more layers of cellulose acetate wound as one may wind a package with shrink wrap for safe shipping, etc. In some examples, the wrapping 316 may be comprised of cellulose acetate sheet(s) containing a fibrous substrate which can add structural integrity and/or improve wicking of the electrolyte 346. The battery 310 further includes anode and cathode current collector tabs 338, 340 extending respectively away from the anode and cathode structures 312, 314, and circuitry 322 to facilitate the flow of current during operation. In circumstances in which the current collector tab 340 pierces the wrapping 316, a sealant may be applied therearound to maintain the integrity of the effective container formed by the wrapping 316.

Figure 6:
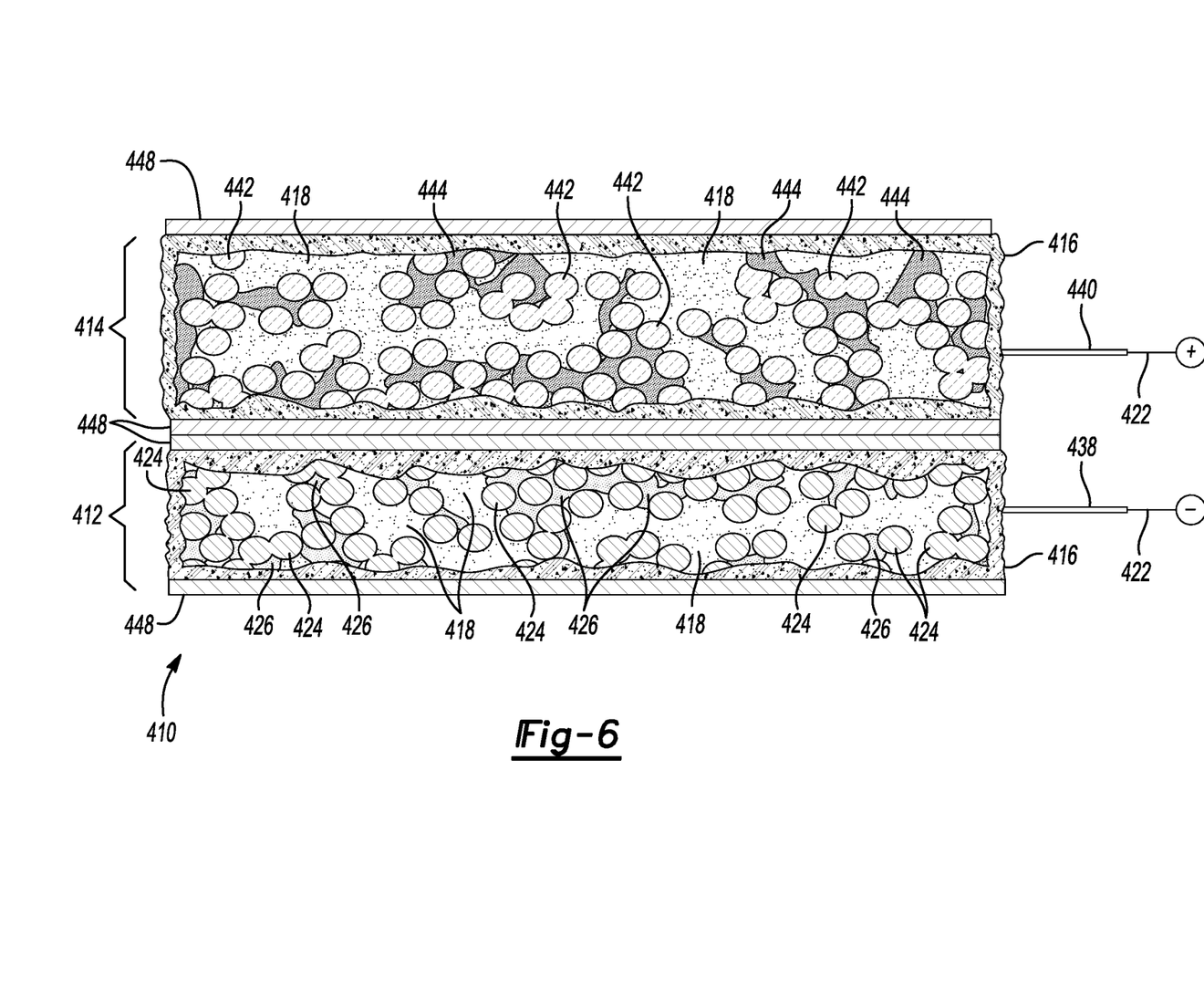

Referring to FIG. 6, a battery 410 includes an anode structure 412 and a cathode structure 414. In this example, the anode structure 412 includes active material particles 424 (e.g., aluminum, zinc, and iron, etc.) held together via a binder or plasticizer 426 (e.g., acrylic binders, aromatic binders, carboxymethyl cellulose, perfluoropolyether, polyethylene glycol, polytetrafluoroethylene, polyvinyl alcohol, polyvinyl chloride, polyvinylidene fluoride, various ionomers, urethanes, etc.) to form a porous structure defining void spaces occupied by electrolyte 418 (e.g., alkaline). The cathode structure 414 includes active material particles 442 (e.g., hydroxides (e.g., $M(OH)_2$, where M=Al, Co, Fe, Mn, Ni, etc.)) held together via a binder or plasticizer 444 (e.g., acrylic binders, aromatic binders, carboxymethyl cellulose, perfluoropolyether, polyethylene glycol, polytetrafluoroethylene, polyvinyl alcohol, polyvinyl chloride, polyvinylidene fluoride, urethanes, various ionomers, etc.) to form a porous structure defining void spaces occupied the electrolyte 418. Each of the structures 412, 414 and the electrolyte 418 therein are contained by respective cellulose acetate coatings 416 that form respective continuous and conformal films adhered to and encapsulating the respective structures 412, 414. In some examples, the structures 412, 414 and electrolyte 418 therein may be contained in a cellulose acetate coating 416 through a fibrous layer which can act as a wicking agent for the electrolyte 418 and/or give structural integrity to the coating, while maintaining a continuous and conformal film adhered to and in contact with the respective structures 412, 414. The battery 410 further includes a separator system of microporous sheets 448 around the cellulose acetate coatings 416. And, anode and cathode current collector tabs 438, 440 extending respectively away from the anode and cathode structures 412, 414, and circuitry 422 to facilitate the flow of current during operation. In circumstances in which the current collector tabs 438, 440 pierce the cellulose acetate coatings 416, a sealant may be applied therearound to maintain the integrity of the effective container formed by the cellulose acetate coatings 416.

Figure 7:
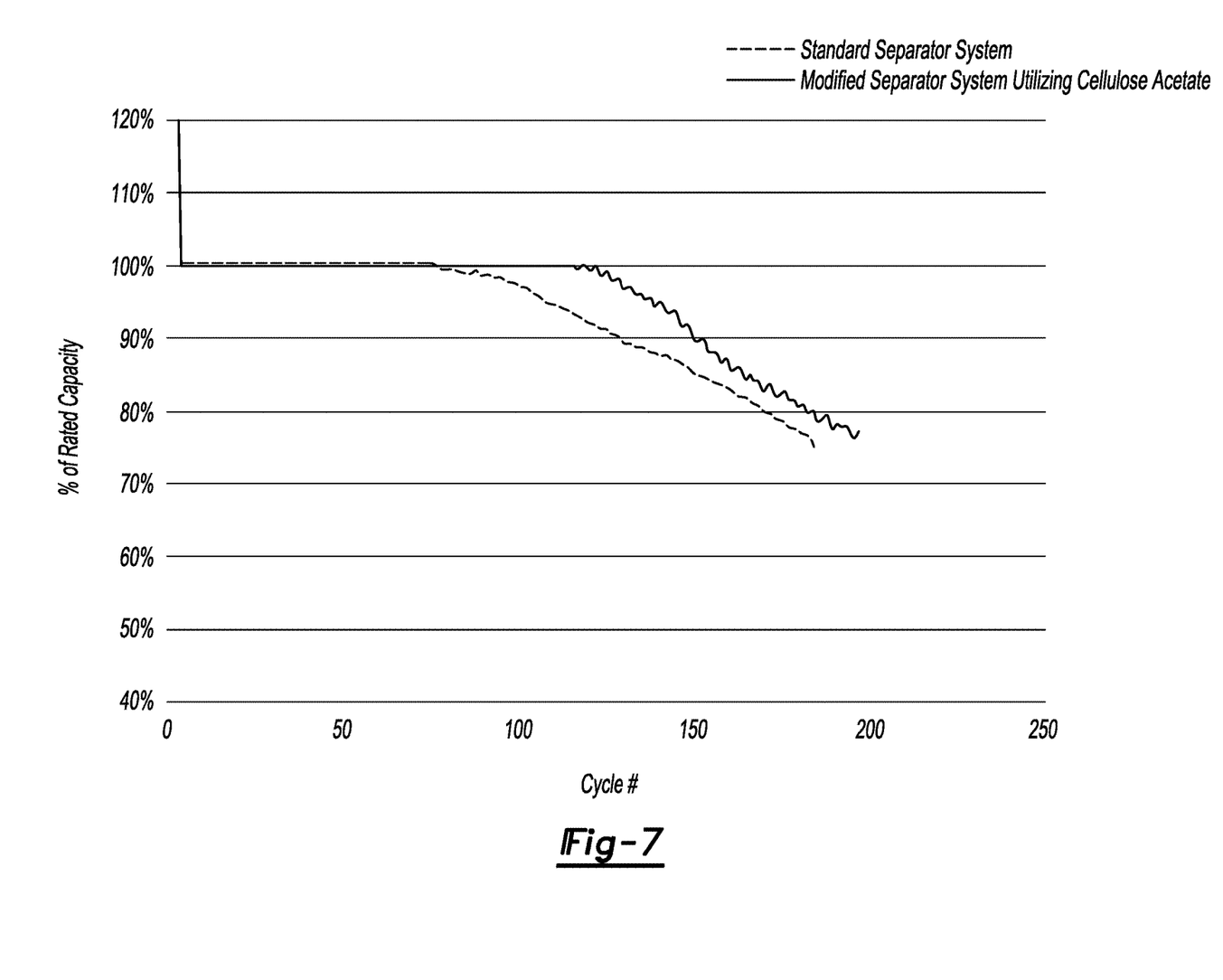
FIG. 7 is a plot of cycle life testing for nickel-zinc pouch cells.

Tests with nickel-zinc pouch cells were conducted with standard separator systems and modified separator systems utilizing cellulose acetate coatings on the electrodes. Both separator systems included two layers of microporous separators and two electrolyte reservoir layers. The modified separator system also included cellulose acetate dip coated electrodes, which formed a film adhered to and encapsulating the electrodes. These cells were cycled at a C/3 rate for both charge and discharge to 100% depth of discharge, based on a name plate rated capacity. The testing of cells containing the modified separator system resulted in a gain, over the standard separator system, of 9.3% in cycle life to 80% utilization and 10.8% gain in overall energy during those cycles as shown in FIG. 7.

While exemplary embodiments are described above, it is not intended that these embodiments describe all possible forms encompassed by the claims. The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to appearance, cost, durability, ease of assembly, life cycle cost, manufacturability, marketability, packaging, serviceability, size, strength, weight, etc. As such, embodiments described as less desirable than other embodiments or prior art implementations with respect to one or more characteristics are not outside the scope of the disclosure and may be desirable for particular applications.

What is claimed is:

1. An electrode assembly comprising:
a zinc electrode including active material particles held together via a binder or plasticizer to form a porous structure defining void spaces;
an alkaline electrolyte occupying the void spaces; and
one or more ionically conductive and electronically insulating cellulose acetate coatings forming a continuous and conformal film adhered to and encapsulating the zinc electrode and alkaline electrolyte, wherein the one or more coatings define pores having diameters less than 50 nanometers configured to block soluble zincate ions formed during charge and discharge of the zinc electrode from travelling through the one or more coatings and to discourage dendritic piercing of the one or more coatings.

2. The electrode assembly of claim 1, wherein the one or more coatings are cellulose diacetate coatings or cellulose triacetate coatings.

3. The electrode assembly of claim 2, wherein the coatings are applied via dip coating, screen printing, slurry casting, spin coating, or spraying.

4. An electrode assembly comprising:
a zinc electrode including active material particles held together via a binder or plasticizer to form a porous structure defining void spaces;
an alkaline electrolyte occupying the void spaces; and
one or more ionically conductive and electronically insulating cellulose acetate sheets encompassing the zinc electrode and alkaline electrolyte, wherein the one or more sheets define pores having diameters less than 50 nanometers configured to block soluble zincate ions formed during charge and discharge of the zinc electrode from travelling through the one or more sheets and to discourage dendritic piercing of the one or more sheets.

5. The electrode assembly of claim 4, wherein the one or more cellulose acetate sheets form a pouch.

6. The electrode assembly of claim 4, wherein 4 the one or more cellulose acetate sheets are cellulose diacetate sheets or cellulose triacetate sheets.

7. The electrode assembly of claim 4, wherein the one or more cellulose acetate sheets are in contact with the zinc electrode.

8. The electrode assembly of claim 4, wherein the one or more cellulose acetate sheets are wrapped around the zinc electrode.

9. The electrode assembly of claim 4, wherein the one or more cellulose acetate sheets are heat sealed to each other.

10. The electrode assembly of claim 4, wherein the one or more cellulose acetate sheets are sealed to each other via an adhesive.

* * * * *